United States Patent
Qin et al.

(10) Patent No.: US 12,454,582 B2
(45) Date of Patent: Oct. 28, 2025

(54) NANOFIBRILLATED CELLULOSE FIBERS

(71) Applicants: Kimberly-Clark Worldwide, Inc., Neenah, WI (US); Shanghai University, Shanghai (CN)

(72) Inventors: Jian Qin, Appleton, WI (US); Donald E. Waldroup, Roswell, GA (US); Youquan Su, Shanghai (CN); Liyi Shi, Shanghai (CN)

(73) Assignee: Kimberly-Clark Worldwide, Inc., Neenah, WI (US)

(*) Notice: Subject to any disclaimer, the term of this patent is extended or adjusted under 35 U.S.C. 154(b) by 0 days.

(21) Appl. No.: 18/180,900

(22) Filed: Mar. 9, 2023

(65) Prior Publication Data

US 2023/0220119 A1     Jul. 13, 2023

Related U.S. Application Data

(62) Division of application No. 16/642,665, filed as application No. PCT/CN2017/099890 on Aug. 31, 2017, now abandoned.

(51) Int. Cl.
| | |
|---|---|
| *C08B 15/05* | (2006.01) |
| *D06M 10/06* | (2006.01) |
| *F26B 3/12* | (2006.01) |
| *D06M 101/06* | (2006.01) |

(52) U.S. Cl.
CPC .............. *C08B 15/05* (2013.01); *D06M 10/06* (2013.01); *F26B 3/12* (2013.01); *D06M 2101/06* (2013.01)

(58) Field of Classification Search
None
See application file for complete search history.

(56) References Cited

U.S. PATENT DOCUMENTS

| | | |
|---|---|---|
| 8,980,054 B2 | 3/2015 | Yang et al. |
| 2006/0254736 A1 | 11/2006 | Jackson et al. |
| 2011/0260348 A1 | 10/2011 | Gardner et al. |
| 2015/0273518 A1 | 10/2015 | Varanasi et al. |
| 2020/0216681 A1 | 7/2020 | Qin et al. |

FOREIGN PATENT DOCUMENTS

| | | |
|---|---|---|
| GB | 2579967 A | 7/2020 |
| WO | WO2012/168346 A1 | 12/2012 |
| WO | WO2015/033026 A1 | 3/2015 |
| WO | WO2017/009241 A1 | 1/2017 |

OTHER PUBLICATIONS

Zhang et al., "Controlled Silylation of Nanofibrillated Cellulose in Water: Reinforcement of a Model Polydimethylsiloxane Network" ChemSusChem vol. 8 pp. 6281-2690, DOI 10.1002/cssc.201500525 (Year: 2015).*

(Continued)

*Primary Examiner* — Eric Olson
(74) *Attorney, Agent, or Firm* — Dority & Manning, P.A.

(57) ABSTRACT

A spray dried non-hydrogen bonded (NHB) nano-fibrillated cellulose (NFC) composition and methods for preparing such composition are disclosed. The spray dried NFC with a NHB effect results in low packing density.

8 Claims, 7 Drawing Sheets

(56) References Cited

OTHER PUBLICATIONS

Khalil et al., "Production and modification of nanofibrillated cellulose using various mechanical processes: A review" Carbohydrate Polymers vol. 99 pp. 649-665, DOI: 10.1016/j.carbpol.2013.08.069 (Year: 2014).*

Zhou et al., "Sustainable, Reusable, and Superhydrophobic Aerogels from Microfibrillated Cellulose for Highly Effective Oil/Water Separation" ACS Sustainable Chemistry and Engineering vol. 4 pp. 6409-6416, DOI: 10.1021/acssuschemeng.6b01075 (Year: 2016).*

Jin et al., "Comparison of sodium carbonate pretreatment for enzymatic hydrolysis of wheat straw stem and leaf to produce fermentable sugars" Bioresource Technology vol. 137 pp. 294-301, DOI:10.1016/j.biortech.2013.03.140 (Year: 2013).*

Yang et al., "Effects of sodium carbonate pretreatment on the chemical compositions and enzymatic saccharification of rice straw" Bioresource Technology vol. 124 pp. 283-291, DOI:10.1016/j.biortech.2012.08.041 (Year: 2012).*

Marin et al., "Response Surface Modeling of Wheat Straw Pulping Using Sodium Carbonate and Sodium Hydroxide Mixtures" Cellulose Chem Technol vol. 51 No. 7-8 pp. 745-753 (Year: 2017).*

Ferrer et al., "Valorization of residual Empty Palm Fruit Bunch Fibers (EPFBF) by microfluidization: Production of nanofibrillated cellulose and EPFBF nanopaper" Bioresource Technology vol. 125 pp. 249-255, DOI:10.1016/j.biortech.2012.08.108 (Year: 2012).*

International Search Report Corresponding to Application No. PCT/CN2018099890 on Jun. 4, 2018.

Cai et al., "Aerogel Microspheres from Natural Cellulose Nanofibrils and Their Application as Cell Culture Scaffold" Biomacromolecules vol. 15 pp. 2450-2457 dx.doi .org/10.1021/bm5003976 (Year: 2014).

Paschoal et al., "Isolation and Characterization of Nanofibrillated Cellulose From Oat Hulls" Quim. Nova, vol. 38, No. 4, 478-482, http://dx.doi.org/10.5935/0100-4042.20150029 (Year: 2015).

Great Britain Office Action Corresponding to Application No. 2003411 on Jan. 11, 2022.

Australian Office Action Corresponding to Application No. 2017 430229 on Aug. 31, 2022.

* cited by examiner

NANOFIBRILLATED CELLULOSE FIBERS

Related Application

The present application is a divisional application of U.S. patent application Ser. No. 16/642,665 filed on Feb. 27, 2020, which is the national stage entry of International Patent Application No. PCT/CN2017/099890 having a filing date of Aug. 31, 2017, both of which are incorporated herein in their entirety by reference thereto.

TECHNICAL FIELD

The present disclosure specifically relates to a composition and methods for preparing a spray dried non-hydrogen bonded (NHB) nano-fibrillated cellulose (NFC) fiber. The spray dried NFC with an NHB effect results in low clumping and low packing density.

BACKGROUND OF THE DISCLOSURE

Cellulose is one of the most abundant biopolymers in nature, and it has been modified in several ways to overcome the difficulties experienced in compatibility. Nanocellulose may be either crystalline nano-cellulose (CNC) or nano-fibrillated cellulose (NFC).

NFC displays high stiffness and strength, and its hydroxyl groups offer reactive sites for chemical modification. Furthermore NFC is an attractive reinforcing filler in thermoplastic matrix materials due to its low density, high fiber surface area, biodegradability, renewability, low cost and gas barrier properties.

NFC may be a building block for bionanocomposites or bio-based nanocomposites. Bionanocomposites disclosed herein are materials made from renewable materials with at least one component having a dimension smaller than 100 nm (e.g., microfibrillated cellulose, MFC, or nano-fibrillated cellulose, NFC).

CNC is obtained from native cellulose fibers by an acid hydrolysis, giving rise to highly crystalline and rigid nanoparticles which are shorter (100s to 1000 nanometers) than NFC. NFC, however, is obtained differently than CNC. The cellulose fiber is pre-treated with a combination of a high pressure and/or an ultrasonic homogenization, heating, microfluidization, and/or mechanical grinding steps.

There are two existing method routes which are capable of producing nano-fibrillated cellulose materials. However, both of these methods have their own challenges. Crystalline nano-cellulose (CNC) is a high cost material and cannot deliver in a nano-fiber form with a high aspect ratio. While nano-fibrillated cellulose (NFC) may only be in a wet dispersion form with a very high viscosity but low solid content.

NFC fibers create a total surface area of at least between 100 to 200 $m^2/g$ which makes the hydrogen bonds more effective and stronger. NFC fibers tend to clump together tightly and orient themselves edgewise. This behavior is due to inter-fiber hydrogen bonds, with the resultant films taking on a plastic-like appearance. Therefore, benefits from the NFC fiber with a high aspect ratio due to too strong of hydrogen bond effect among the NFC fiber would not be realized. However, in order to achieve a nano-fibrillated surface by using a NFC fiber the hydrogen bonds have to be eliminated.

Accordingly, there remains a need to develop a NHB effect on nano-sized NFC fiber that produce a dry NFC with low clumping and low packing density particularly for use on a commercial scale.

SUMMARY OF THE DISCLOSURE

The current disclosure discloses unexpected and surprising routes using a previously treated non-hydrogen bonded effect (NHB) on a cellulose raw material such as wood pulp fiber and subjecting it to a nano-fibrillation process to produce a NHB NFC fiber that may be spray dried thereafter. The second method route comprises applying a chemical treatment to a prepared NFC fiber to achieve the NHB effect that may be spray dried thereafter.

In a first embodiment, the present disclosure discloses a spray dried non-hydrogen bonded (NHB) nano-fibrillated cellulose (NFC) fiber comprising an NFC with a packing density of about 0.4 g/cc or less.

In a second embodiment, the composition according to the preceding embodiment, wherein the spray dried NHB NFC fiber is made from a slurry wherein the NHB NFC has an aspect ratio great than about 20 and a fiber diameter from about 100 to about 500 nanometers.

In another embodiment, the composition according to the preceding embodiment, wherein the spray dried NHB NFC fiber has an aspect ratio great than about 20 before it was spray dried.

In a third embodiment, the present disclosure also discloses a method for preparing a spray dried non-hydrogen bonded (NHB) nano-fibrillated cellulose (NFC) composition which comprises: treating a cellulose fiber with a weight % of at least about 1% or higher in water slurry with a caustic agent under a combination of temperature and pressure; neutralizing the treated cellulose fiber with an acid; homogenizing or ultrasonically treating the pre-treated cellulose fiber to form a NFC slurry; dewatering the NFC slurry by a centrifugal machine to achieve a solid level at a weight % of at least about 10 or higher; mixing the treated NFC slurry with alcohol at a ratio of NFC to alcohol 1 to 30; reacting the treated NFC slurry with a reagent having a general formula (I) or (II) at an elevated temperature at least about 20° C. or higher for at least 30 minutes:

(I)

wherein R1 equals a carbon containing alkane group, preferably an alkane group containing 1 to 6 carbon atoms; R1 further may contain alkylene groups;

wherein X1, Y1, Z1 are alkoxy groups, whereby these groups may be the same or different, further wherein X1, Y1, or Z1 are preferably methoxy or oxyethyl groups; and wherein one or two groups among X1, Y1, Z1 may also be a carbon containing alkane group, preferably an alkane group containing 1 to 6 carbon atoms; or

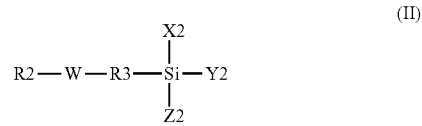

(II)

wherein R2 equals a carbon containing alkane group, preferably an alkane group containing 1 to 6 carbon atoms; R2 further may contain alkylene groups;

W may be either oxygen (O) or nitrogen (N) atom;

R3 equals a carbon containing alkane group, preferably an alkane group containing 1 to 6 carbon atoms;

X2, Y2, Z2 equal alkoxy groups, wherein these groups may be the same or different, preferably methoxy or oxyethyl groups;

further one or two groups among X2, Y2, Z2 may also be a carbon containing alkane group, preferably an alkane group containing 1 to 6 carbon atoms; and thereafter drying the NFC slurry with a spray drying equipment.

The homogenization is carried out by an equipment which is operated under a pre-set pressure. An example of the homogenizer used herein is Model An60L 70 homogenizer manufactured by Shenlu Homogenizer Co. Ltd. Shanghai, China and operated under a pre-set pressure of 60 MPa. An example of the ultrasonic equipment used herein is Equipment FS-24000; Manufacturer: Shanghai SX-SONIC Instrument Co. Ltd., wherein the operating conditions are as follows: ultrasonic power density range is from 0.1 to 0.5 watt/cm$^2$ and ultrasonic frequency 15 to 200 kHz.

In a fourth embodiment, the method according to the preceding embodiment, wherein the cellulose fiber is wood pulp fiber or non-wood fiber.

In a fifth embodiment, the method according to any of the preceding method embodiments wherein the acid is HCl, nitric acid, sulfuric acid, acetic acid, phosphoric acid, citric acid or any similar acid thereof.

In a sixth embodiment, the method according to any of the preceding method embodiments, wherein the caustic agent is a soda based alkali which is about 5 weight % in the water slurry.

In a seventh embodiment, the method according to any of the preceding method embodiments, wherein the spray dried NHB NFC fiber has an aspect ratio great than about 20 before it has been dried.

In an eighth embodiment, the method according to any of the preceding method embodiments, wherein the spray dried NHB NFC fiber has an average diameter of about 100 nm to about 500 nm before it has been dried.

The aspect ratio and average diameter of the NHB NFC refer to its dimension in its slurry form. The NHB effect reduces clumping significantly and results in a fine particle size in a spray dried powder form. However, the powder is not a single NFC fiber. Therefore, a packing density defines dried NFC.

In a ninth embodiment, the method according to any of the preceding method embodiments, wherein the NHB NFC fiber has a packing density less than about 0.4 g/cc.

In a tenth embodiment, the present disclosure discloses a method for preparing a spray dried non-hydrogen bonded (NHB) nano-fibrillated cellulose (NFC) composition which comprises: reacting a cellulose fiber with a cellulosic reactive reagent selected from the group consisting of reagents having the general Formula (III) or (IV)

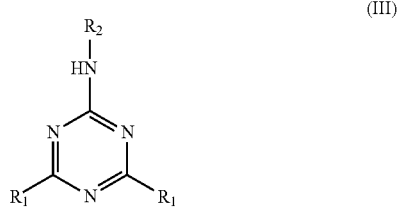

(III)

wherein $R_1$ equals F, Cl, Br, or I and $R_2$ equals $(CH_2)_n$—OH (n=1-3), $(CH_2)_n$—COOH (n=1-3), $C_6H_5$—COOH, or $HSO_3X$ where X equals $(CH_2)_n$ (n=1-3) or $C_6H_4$; or a vinyl sulfone having the general Formula (IV)

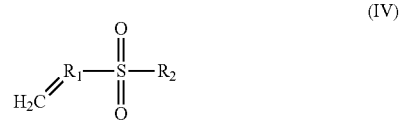

(IV)

wherein $R_1$ equals a hydrocarbon having from about 1 to about 5 carbon atoms and R2 equals $CH_3$, $HC=CH_2$, $(CH_2)_n$—$CH_3$ (n=1-3), $(CH_2)_n$—COOH (n=1-3), $C_6H_4$—COOH, or $C_6H_5$;

treating the cellulose fiber with a caustic agent;

washing the cellulose fiber;

treating the cellulose fiber at a weight % of at least 1% or higher water slurry with a caustic agent under a combination of temperature and pressure;

neutralizing the treated cellulose fiber with an acid;

homogenizing or ultrasonically treating the treated cellulose fiber to form a NFC slurry;

drying the NFC slurry by a spray drying equipment.

In an eleventh embodiment, the method according to the preceding method embodiment, wherein the cellulose fiber is wood pulp fiber or non-wood fiber.

In a twelfth embodiment, the method according to any of the preceding method embodiments, wherein the acid is HCl, nitric acid, sulfuric acid, acetic acid, phosphoric acid, citric acid or any similar acid thereof.

In a thirteenth embodiment, the method according to any of the preceding method embodiments, wherein the soda based alkali water slurry is about 5 weight %.

In a fourteenth embodiment, the method according to any of the preceding method embodiments, wherein the spray dried NHB NFC has an aspect ratio great than about 20.

In a fifteenth embodiment, the method according to any of the preceding method embodiments, wherein the spray dried NHB NFC have an average diameter of about 100 nm to about 500 nm.

In a sixteenth embodiment, the method according to any of the preceding method embodiments, wherein the spray dried NHB NFC has a packing density less than about 0.4 g/cc.

In a seventeenth embodiment, the present disclosure discloses a method for preparing an aqueous nano-fibrillated cellulose (NFC) which comprises chemically treating a cellulose fiber with a weight % of at least about 1 weight % or higher in water slurry with soda-based alkali under a combination of temperature and pressure; neutralizing the chemically treated cellulose with an acid; optionally microwaving the cellulose slurry at a high intensity level (wherein the intensity level is either high, medium or low setting) for about 10 to about 30 minutes; and homogenizing or ultrasonically treating the pre-treated cellulose fiber to form a final product of NFC slurry.

In an eighteenth embodiment, the method according to the preceding embodiment, wherein the cellulose fiber is wood pulp fiber, non-wood fiber such as bamboo fiber and cotton or any cellulose fiber thereof.

In a nineteenth embodiment, the method according to any of the preceding method embodiments, wherein the acid is HCl, nitric acid, sulfuric acid, acetic acid, phosphoric acid, citric acid or any similar acid thereof.

In a twentieth embodiment, the method according to any of the preceding embodiments, wherein the soda based alkali water slurry has a weight % of about 5%.

In a twenty-first embodiment, the method according to any of the preceding method embodiments, wherein the aqueous NFC fiber has an aspect ratio great than about 20.

In a twenty-second embodiment, the method according to any of the preceding method embodiments, wherein the aqueous NFC fiber has an average diameter of about 100 nm to about 500 nm.

In a twenty-third embodiment, the present disclosure discloses a method preparing a non-hydrogen bond (NHB) nano-fibrillated cellulose (NFC) which comprises chemically treating a cellulose fiber (non-NHHB) in at least about 1 weight % or higher in water slurry with a caustic agent under a combination of temperature and pressure; neutralizing the chemically treated cellulose fiber with an acid; homogenizing or ultrasonically treating the pre-treated cellulose fiber wherein the fiber forms an NFC slurry; dewatering the NFC slurry by a centrifugal machine to achieve a solid NFC slurry level of at least a weight % of about 10% or higher; mixing the treated NFC slurry with alcohol at a weight ratio of the NFC to alcohol from about 1 NFC to 30 alcohol; and reacting the treated NFC slurry with a reagent having a general formula (I) at a temperature of about 20 degrees C. or higher and for about 30 minutes or more

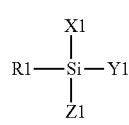

(I)

wherein R1 equals a carbon containing alkane group, preferably an alkane group containing 1 to 6 carbon atoms; R1 may further contain alkylene groups;

wherein X1, Y1, Z1 equal alkoxy groups, whereby these groups may be the same or different and further wherein X1, Y1, or Z1 are the preferably methoxy or oxyethyl groups;

further wherein one or two groups among X1, Y1, Z1 may also be a carbon containing alkane group, preferably an alkane group containing 1 to 6 carbon atoms.

In a twenty-fourth embodiment, the method according to the preceding embodiment, wherein the prepared aqueous NHB NFC fiber has an aspect ratio about or great than 20.

In a twenty-fifth embodiment, the method according to any of the preceding method embodiments, wherein the prepared aqueous NHB NFC fiber has an average diameter of about 100 nm to about 500 nm.

In a twenty-sixth embodiment, the method according to any of the preceding method embodiments, wherein the NHB NFC fiber is spray dried. The NHB NFC fiber may be spray dried. The NHB NFC fiber may be spray dried onto a substrate or form a powder.

In a twenty-seventh embodiment, the present disclosure discloses a method for preparing a non-hydrogen bonded (NHB) nano-fibrillated cellulose (NFC) which comprises chemically treating a NHB cellulose fiber with a weight % of at least about 1 or higher in water slurry under a combination of temperature and pressure with a soda based alkali;

neutralizing the chemically treated cellulose fiber with an acid;

homogenizing or ultrasonically treating the pre-treated cellulose fiber wherein the fiber forms an NFC slurry.

In a twenty-eighth embodiment, the method according to the preceding method embodiments, wherein the aqueous NHB NFC fiber has an aspect ratio greater than about 20.

In a twenty-ninth embodiment, the method according to any of the preceding method embodiments, wherein the aqueous NHB NFC fiber have an average diameter of about 100 nm to about 500 nm.

In a thirtieth embodiment, the method according to any of the preceding embodiments, wherein the NHB NFC fiber is spray dried. The NHB NFC fiber may be spray dried onto a substrate or to form a powder.

In a thirty-first embodiment, the method according to any of the preceding embodiments, wherein the NHB NFC fiber has a packing density less than about 0.4 Wm.

In a thirty-second embodiment, the present disclosure discloses a spray dried non-hydrogen bonded (NHB) nano-fibrillated cellulose (NFC) composition prepared from any of the preceding methods.

There are two groups of chemical reagents which are capable of reacting with cellulose fiber's hydroxyl group and rendering the treated cellulose fiber the NHB effect: the first group includes those chemicals capable of reacting with cellulose fiber in presence of either water or an organic solvent, such as an alcohol, while the second group requires a post heat treatment without any presence of water to induce the chemical reaction. Suitable chemical reagents from the first group include, but are not limited to, the reagents having a general formula (III) or (IV), organic silicate, such as tetraethyl orthosilicate (TEOS), and organic silane, such as γ-aminopropyl-triethoxysilane, etc. Suitable chemical reagents from the second group are commonly called cellulose fiber crosslinking agents. Suitable crosslinking agents are those substances comprising at least two functional groups reactive to the hydroxyl groups on cellulose fiber. Examples include, but are not limited to, urea derivatives, such as dimethylol dihydroxyethyleneurea (DMDHEU) or dimethylol ethylene urea (DMEU), organic molecules having carboxylic acid and aldehyde functional groups, such as glyoxylic acid and succinic semialdehyde, polyepoxides having hydrophobic saturated, unsaturated, branched and unbranched alkyls, such as 1,4-cyclohexanedimethanol diglycidyl ether, diglycidyl 1,2-cyclohexanedicrboxylate, N, N-diglycidylaniline, N, N-diglycidyl-4-glycidyloxyaniline, and diglycidyl 1,2,3,4-tetrahydrophthalate and glycerol propoxylate triglycidyl ether, and other suitable additional crosslinking agents include C2-C9 polycarboxylic acids, such as butantetracarbocylic acid, citric acid, itaconic acid, maleic acid, tartaric acid, glutaric acid, polyacrylic acid, polymaleic acid, polyaspartic acid, and polyethacrylic acid.

In yet another embodiment according to any of the preceding embodiments, wherein a cellulose fiber may be chemically treated with organic silicate, such as tetraethyl orthosilicate (TEOS), and organic silane, such as γ-aminopropyl-triethoxysilane, triazine, DMDHEU, DMEU, organic molecules having carboxylic acid and aldehyde functional groups, such as glyoxylic acid and succinic semialdehyde, polyepoxides having hydrophobic saturated, unsaturated, branched and unbranched alkyls, such as 1,4-cyclohexanedimethanol diglycidyl ether, diglycidyl 1,2-cyclohexanedicrboxylate, N, N-diglycidylaniline, N, N-diglycidyl-4-glycidyloxyaniline, and diglycidyl 1,2,3,4-tetrahydrophthalate and glycerol propoxylate triglycidyl ether, and other suitable additional crosslinking agents include C2-C9 polycarboxylic acids, such as butantetracarbocylic acid, citric acid, itaconic acid, maleic acid, tartaric acid, glutaric acid, polyacrylic acid, polymaleic acid, polyaspartic acid, and polyethacrylic acid.

The above summary of the present disclosure is not intended to describe each embodiment or every implementation of the present disclosure. Advantages and attainments, together with a more complete understanding of the disclosure, will become apparent and appreciated by referring to the following detailed description and claims taken in conjunction with the accompanying drawings.

BRIEF DESCRIPTION OF DRAWINGS

The disclosure may be more completely understood in consideration of the following detailed description of various embodiments in connection with the accompanying drawings, in which.

Figure 1:
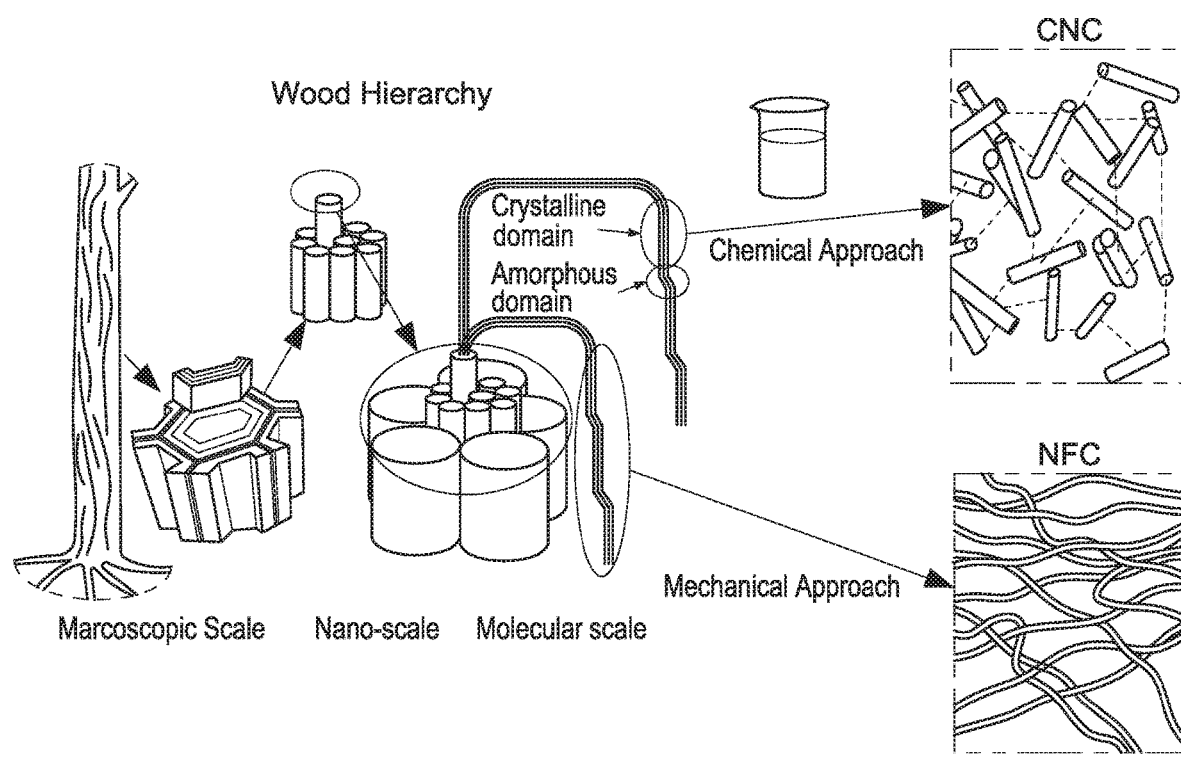
FIG. 1 is a perspective view of two methods of preparing a nano-cellulose material from cellulose fiber.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the scope of the disclosure.

DETAILED DESCRIPTION OF THE DISCLOSURE

Each example of this disclosure is provided by way of explanation and is not meant as a limitation. For example, features illustrated or described as part of one embodiment or figure can be used on another embodiment or figure to yield yet another embodiment. It is intended that the present disclosure include such modifications and variations.

Although some suitable dimensions, ranges and/or values pertaining to various components, features and/or specifications are disclosed, one of skill in the art, incited by the present disclosure, would understand desired dimensions, ranges and/or values may deviate from those expressly disclosed.

When introducing elements of the present disclosure or the preferred embodiment(s) thereof, the articles "a", "an", and "the" are intended to mean that there are one or more of the elements.

The terms "comprising", "including" and "having" are intended to be inclusive and mean that there may be additional elements other than the listed elements. Many modifications and variations of the present disclosure can be made without departing from the spirit and scope thereof.

Therefore, the exemplary embodiments described above should not be used to limit the scope of the invention.

A "cellulose fiber" or "cellulosic fiber" disclosed herein may be wood pulp fiber, such as *eucalyptus* fiber (EUC), northern soft wood kraft (NSWK) or southern soft wood kraft (SSWK) fiber, cotton fiber, such as cotton lint or cotton flock fiber, bamboo fiber, and other wood or non-wood cellulose fibers.

A "soda based alkali" disclosed herein may be sodium carbonate, sodium bicarbonate, potassium carbonate, potassium bicarbonate, or any other basic carbonates or bicarbonate or any similar compound capable of achieving a pH value of greater than 10.

An "acid" disclosed herein may be an organic or inorganic acid such as HCl, nitric acid, sulfuric acid, acetic acid, phosphoric acid, citric acid or any similar acid thereof wherein the acid would have a adequate acidity so that the treated cellulose fiber may retreat back to a neutral pH value from a basic value.

A "nano-fibrillated cellulose slurry" or an "NFC slurry" disclosed herein is any compound or combination thereof according to the methods described herein that may prepare a spray dried non-hydrogen bonded nano-fibrillated cellulose fiber.

A "water slurry" disclosed herein is a mixture of a cellulose fiber and water at a weight ratio from about 1 to about 1000 or from about 1 to about 5.

A "temperature and pressure" disclosed herein are determined by heating the water slurry to a temperature between about 150° C. and about 200° C. in a pressurized autoclave for about 4 to about 5 hours (treatment is carried out in a closed vessel, so the temperature and pressure follow a fixed trend which may depend only on temperature).

Wood pulp fibers are a preferred starting material for preparing a modified cellulosic fiber. Wood pulp fibers may be formed by a variety of pulping processes, such as kraft pulp, sulfite pulp, thermomechanical pulp, and the like. Further, the wood pulp fibers may be any high-average fiber length wood pulp, low-average fiber length wood pulp, or mixtures of the same. One example of suitable high-average length wood pulp fibers include softwood fibers such as, but not limited to, northern softwood, southern softwood, redwood, red cedar, hemlock, pine (e.g., southern pines), spruce (e.g., black spruce), combinations thereof, and the like. One example of suitable low-average length wood pulp fibers include hardwood fibers, such as, but not limited to, *eucalyptus*, maple, birch, aspen, and the like. In certain instances, *eucalyptus* fibers may be particularly desired to increase the softness of the web. *Eucalyptus* fibers can also enhance the brightness, increase the opacity, and change the pore structure of the tissue product to increase its wicking ability. Moreover, if desired, secondary fibers obtained from recycled materials may be used, such as fiber pulp from sources such as, for example, newsprint, reclaimed paperboard, and office waste.

Figure 2:
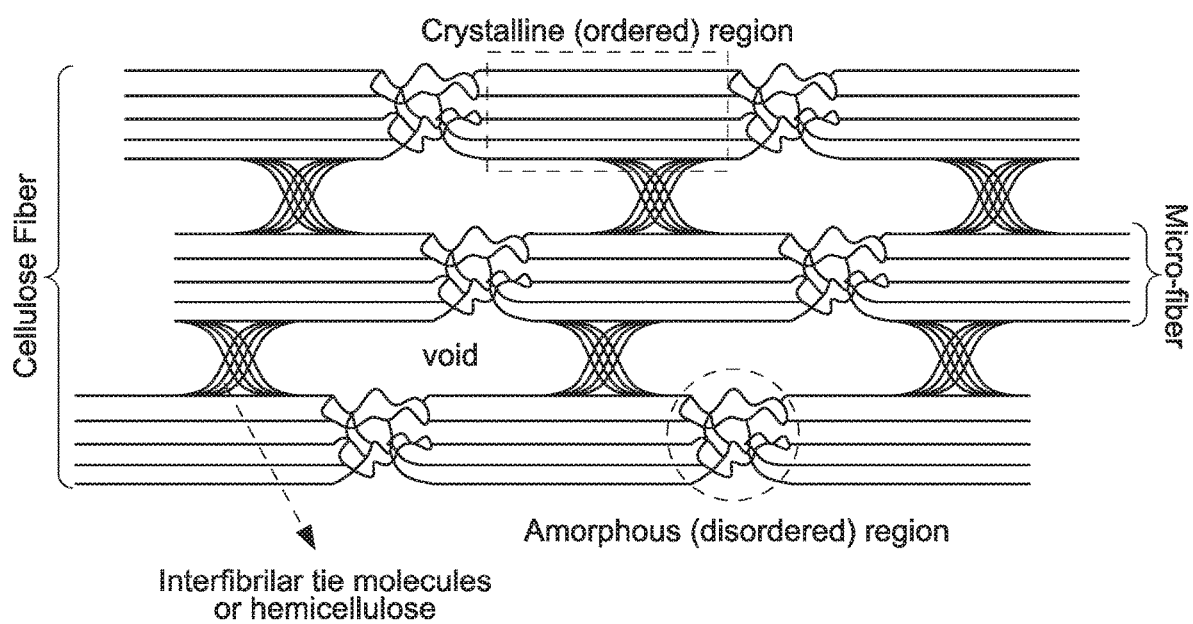
FIG. 2 is a perspective view of a cellulose fiber separated into small pieces both in fiber length direction and cross fiber direction.

FIG. 1 summarizes two major methods of preparing a nano-cellulose material from cellulose fiber. The first is a method using chemical extraction process which cannot retain fiber form, while the second involves many steps of treatments to preserve the fiber's shape with a much reduced diameter. Because of using a chemical to remove both amorphous (or disordered) cellulose regions and interfibrilar tie molecules/hemicellulose from the native cellulose fiber (refer to FIG. 2 for detail), a cellulose fiber throughout the chemical extraction procedure is usually broken into many smaller pieces both in fiber direction and cross fiber direction. Therefore, the dimension of final prepared nano-cellulose material may be determined by cellulose crystalline domain sizes. CNC tends to be a fine powder in a length of about hundreds to thousands nanometers. It is difficult, though, to get a nano-material with a high aspect ratio through the CNC method. Also, the CNC method route tends not to be cost effective due to low productivity, low yield rate and chemical expenses.

NFC, however, is produced by a different method route than CNC. The cellulose fiber is pre-treated at an alkali condition and then homogenized by either high pressure steam and/or ultrasonic treatment. A NFC prepared by this way tends to keep fiber shape with a certain aspect ratio of fiber length to fiber diameter. When a cellulose fiber was pre-treated well enough, meaning effectively removing interfibrilar tie molecules or hemicellulose, a NFC with a high aspect ratio can be achieved. There is another method to produce a NFC with very low aspect ratio. This latter method has a very high productivity and low operating cost. For this method, the conditioned cellulose fiber as described before is then followed by mechanical grinding to tear apart the fiber into many nano-fibers along both cellulose fiber direction and cross cellulose fiber direction. The mechanical grinding preparation route must be conducted in a water dispersion. When a nano-cellulose fiber product is generated in water, the product dispersion tends to be very viscous such as in gel form.

The current disclosure discloses the development of a nano-cellulose fiber with an aspect ratio greater than 20. First a homogenizer and/or an ultrasonic equipment was used to treat cellulose fiber with high pressure homogenization and high frequency ultrasonic treatment. An ultrasonic process involves the use of an ultrasonic head (also called ultrasonic horn) immersed in a water medium and applying energy to the water and any other objects in the water through the ultrasonic head. The ultrasonic energy will cause the water medium vibration at a very high frequency which, when sufficiently, shakes the pre-treated cellulose fiber so severely that it causes each individual nano-fibrils dispersed into the water medium uniformly. The homogenization process is also similar to this process. The differences are that the homogenization process applies a high pressure to the water medium and pre-treating the cellulose fiber flowing through a die with a very small diameter. This action causes a formation of fiber orientation 100% in the water flow direction and also at a high flow rate. When the fiber finishes its travel through the die, the fiber will hit a metal wall and is stopped instantly. A combination of a high speed movement and the instant stopping of the fiber in water will cause the fiber itself to vibrate severely and further induce the separation of each individual nano-fibrils into the water uniformly.

The nano-cellulose material produced from the mechanical grinding method and chemical treatment prior to their nano-fibrillation process resulted in an aspect ratio of near 1. An aspect ratio of near 1 means that the fiber length is about equal to its width (refer to SH-CC-950 in FIG. 3). In order to increase the aspect ratio a modification of the pre-treatment alkali chemistries were made as well as adding an optional microwave treatment step and use of either homogenization or ultrasonic treatment. The modifications of the pre-treatment alkali chemistries involved chemically treating a cellulose fiber in at least about 1 weight % of water slurry with soda based alkali placed under a combination of temperature and pressure. The soda based alkali pre-treatment was used to weaken interfibrillar tie molecules/hemicellulose. Other caustic agent, such as sodium hydroxide, can do the same job as the soda based alkali. However, the soda based alkali has advantage to achieve a higher fiber aspect ratio. An explanation will be provided in the paragraph below. After the pre-treatment by either a soda based alkali or caustic agent, the treated cellulose fiber has to be neutralized by an acid. Concentrations of the acid may be calculated based on the amount of acid resulting in an equivalent molar amount to neutralize the alkali. This alkali treatment may cause cellulose fibers to swell and soda alkali or NaOH molecules then penetrate into cellulose interfibrillar region to break or weaken the tie molecules. The use of the chemical treatment to weaken the interfibrillar tie molecules or hemicellulose can help prevent micro- and nano-fibers from being cut in cross-sectional direction and achieve a high aspect ratio of micro- and nano-fibrillated fibers.

However, it was unexpectedly and surprisingly discovered that a soda based alkali such as $Na_2CO_3$ or any similar compound thereof may increase NFC aspect ratio higher than NaOH wherein the $Na_2CO_3$ concentration used herein is in the range between about 1 to about 30 weight percent of the total weight. And more preferably a $Na_2CO_3$ concentration of about 5 weight percent of the total weight was used. Unlike NaOH, $Na_2OH_3$ further generates a gas when it reacts with an acid in the neutralization step. After the alkali treatment, the pre-treated cellulose fiber has to be neutralized by an acid such as HCl or other similar acids which may be an organic or inorganic acid such as nitric acid, sulfuric acid, acetic acid, phosphoric acid, citric acid or any similar acid thereof wherein the acid would have a adequate acidity so that the treated cellulose fiber may retreat back to a neutral pH value from a basic value.

Figure 3:
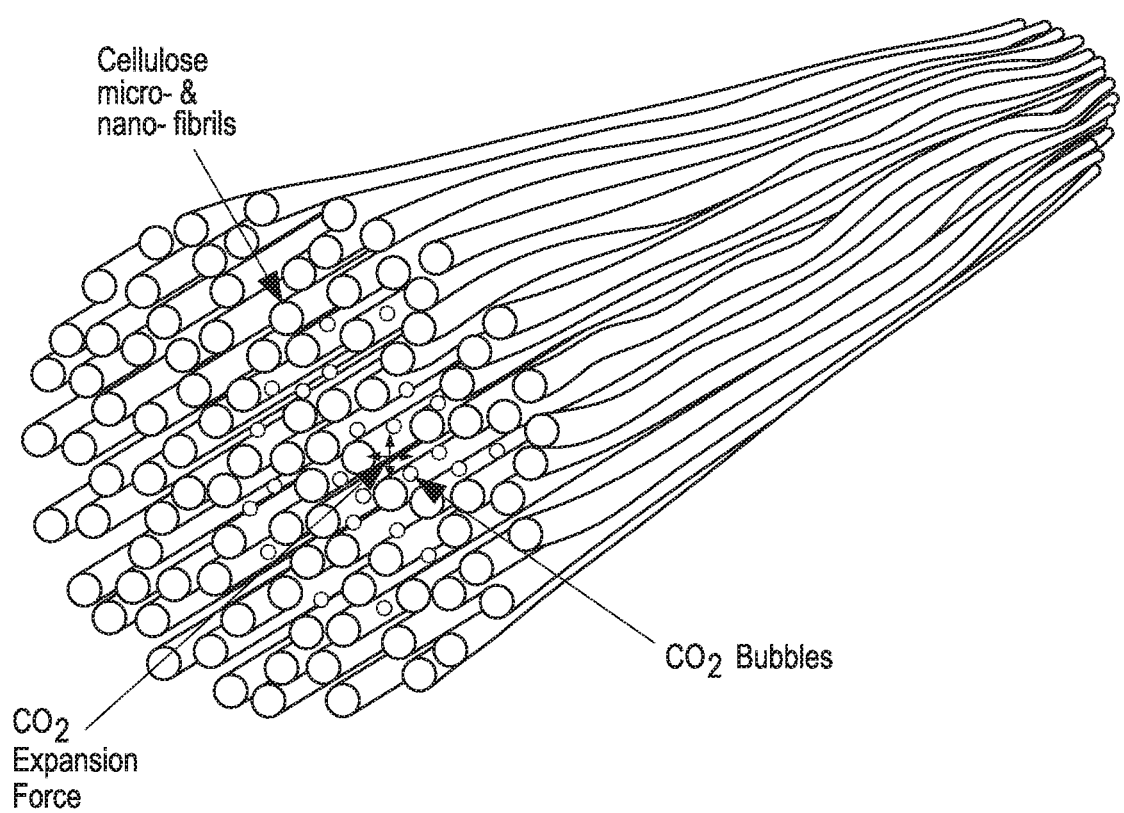
FIG. 3 illustrates trapped CO2 gas bubbles and expansion directions when heated and/or treated by a microwave treatment.

In the case of using $Na_2CO_3$, $CO_2$ gas was generated after adding HCl, or any similar disclosed acid herein thus neutralizing $Na_2CO_3$, but the $CO_2$ is trapped as gas bubbles inside internal voids between cellulose micro- or nano-fibrils (white circles in FIG. 3 represent $CO_2$). When an optional microwave treatment was applied after the pre-chemical treatment, these trapped gas bubbles were heated, expanded and generated fiber forces outward which can push both micro- or nano-fibrils apart in a radius direction without causing a length reduction in fiber direction.

Figure 4:
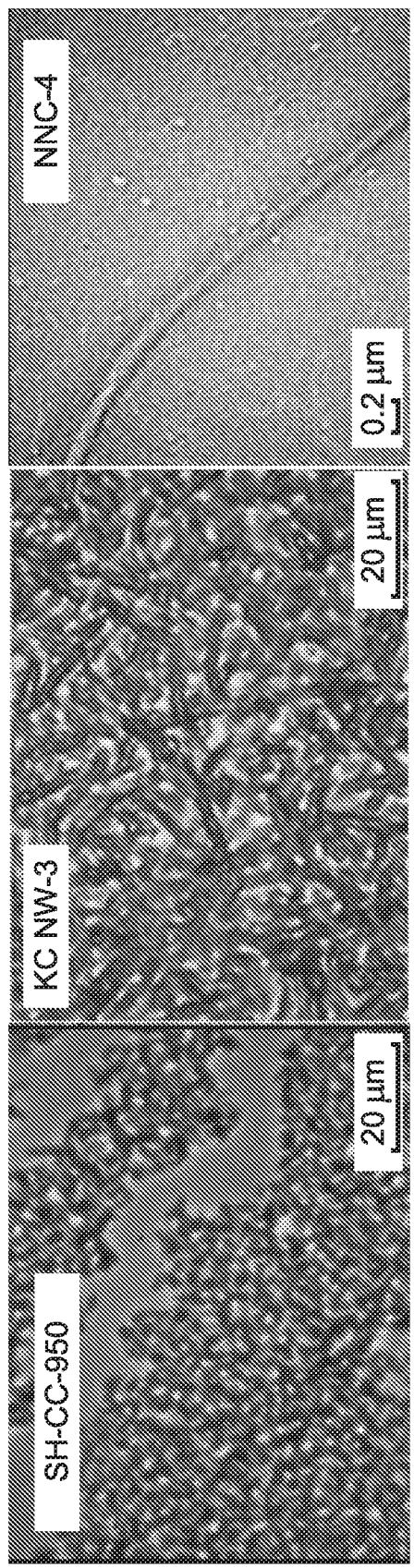
FIG. 4 illustrates SEM photos of NFC samples that demonstrate a significantly enhanced aspect ratio.

FIG. 3 illustrates trapped $CO_2$ gas bubbles and expansion directions when heated by a microwave treatment. Two NFC samples, KC-NW-3 and NNC-4, were prepared using $Na_2CO_3$ as the alkali agent. The scanning electron microscope (SEM) photos of NFC samples shown in FIG. 4 clearly demonstrated a significantly enhanced aspect ratio.

The high aspect ratio NFC prepared by the above herein disclosed method was sprayed onto a substrate. The coated surface was checked by scanning electron image analysis (SEM).

Figure 5:
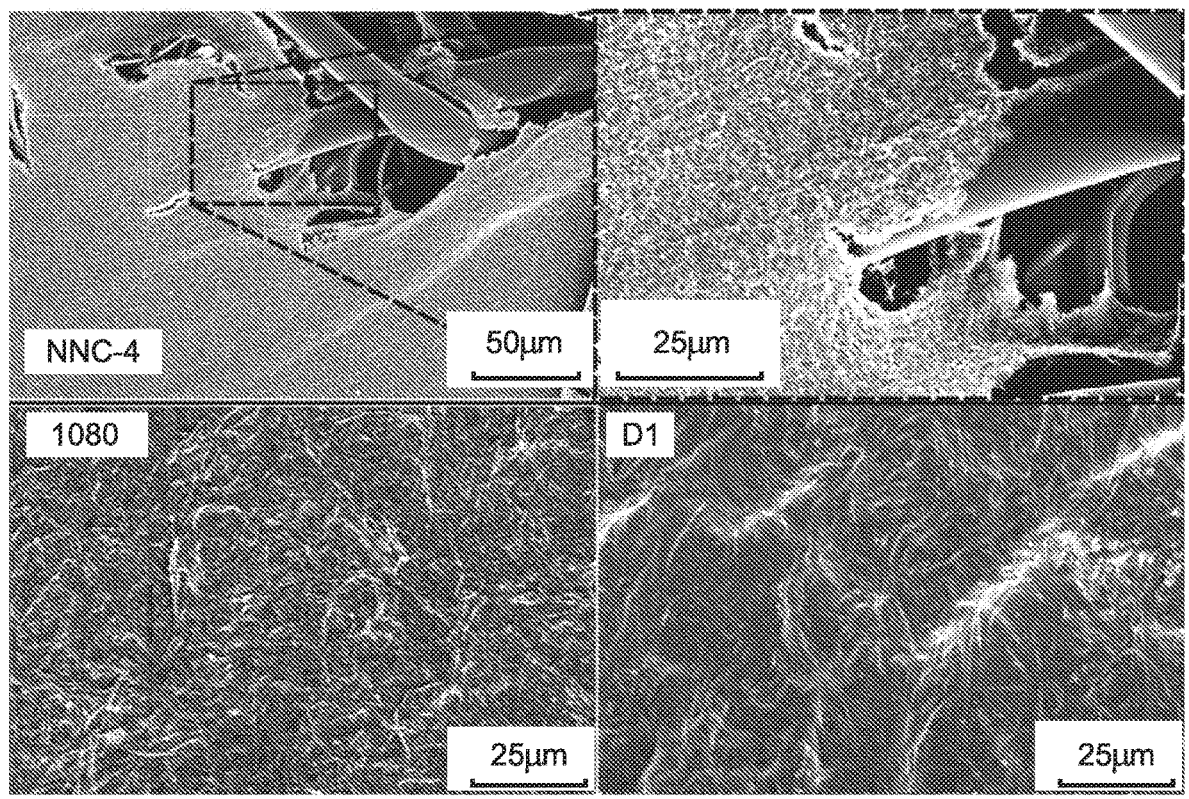
FIG. 5 illustrate SEM photos of samples wherein the NFC fiber exhibit an NHB effect.

In FIG. 5, SEM pictures of two top photos are images of the coated surface by Sample NNC-4. The images exhibit a very dense and smooth surface. The reason for forming such a dense and smooth surface in the spray coated layer is related to hydrogen bonds between cellulose fibers.

A nano-cellulose fiber with NHB effect (NHB NFC fiber) was prepared by two methods disclosed herein. The first method route comprises using a previously treated NHB cellulose raw material such as a wood pulp fiber and subject it to the disclosed nano-fibrillation process to produce a NHB NFC fiber. The second method route comprises applying a chemical treatment to a prepared NFC fiber to achieve the NHB effect.

Two bottom photos in FIG. 5 represent SEM photos of NHB NFC fibers prepared from these two method routes. 1080 is a NHB NFC fiber which was nano-fibrillated from a NHB wood pulp fiber from EUC wood pulp fiber chemically modified by 2-(4,6-dichloro-(1,3,5)-triazine-2 aminoyl) benzylsulfonic acid (disclosed in U.S. Pat. No. 8,980,054 B2 Table 1 Sample No. 5). D1 is a NFC fiber nano-fibrillated from regular EUC wood pulp fiber and then chemically modified by an organic silicone chemistry process to achieve the NHB effect wherein a general organic silicone chemistry method is described in detail under Experimental Sample Preparation Description (refer to Example D1).

Both NFC fibers exhibit the NHB effect with distinct and separate individual fibers and a nano-fibrillated and rough surface in their respective SEM photos depicted in FIG. 5. These two photos are quite different in terms of the surface images in comparison to the NNC-4 NFC SEM photos shown in FIG. 4. This indicates that a NHB NFC fiber has a significantly reduced amount of hydrogen bonds formed between each individual fiber. Therefore, each individual nano-fiber may be seen on the NHB NFC fiber surface.

Figure 6:
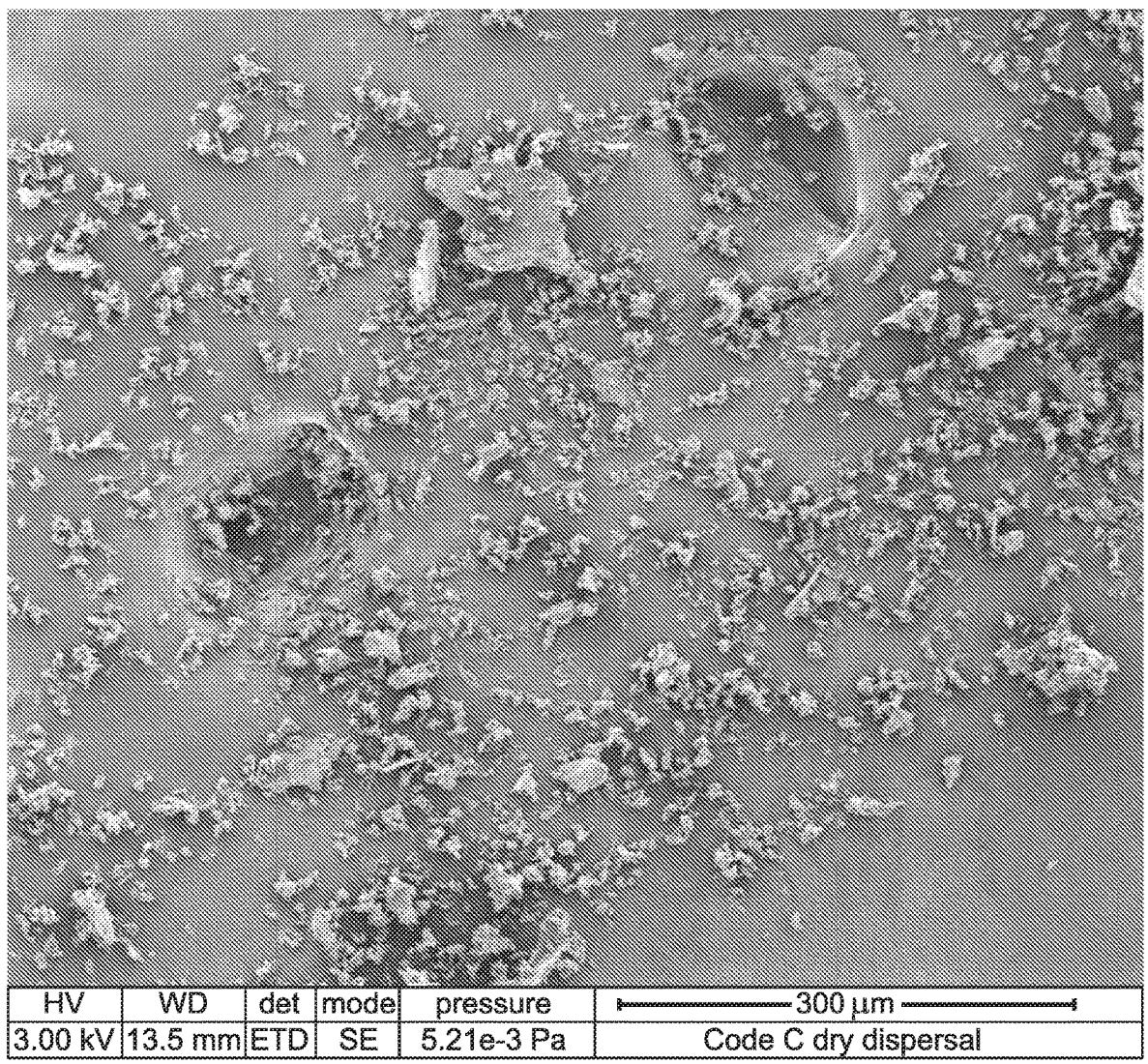
FIG. 6 illustrate SEM photos of spray dried NFC fiber using a NFC slurry without NHB effect.
Figure 7:
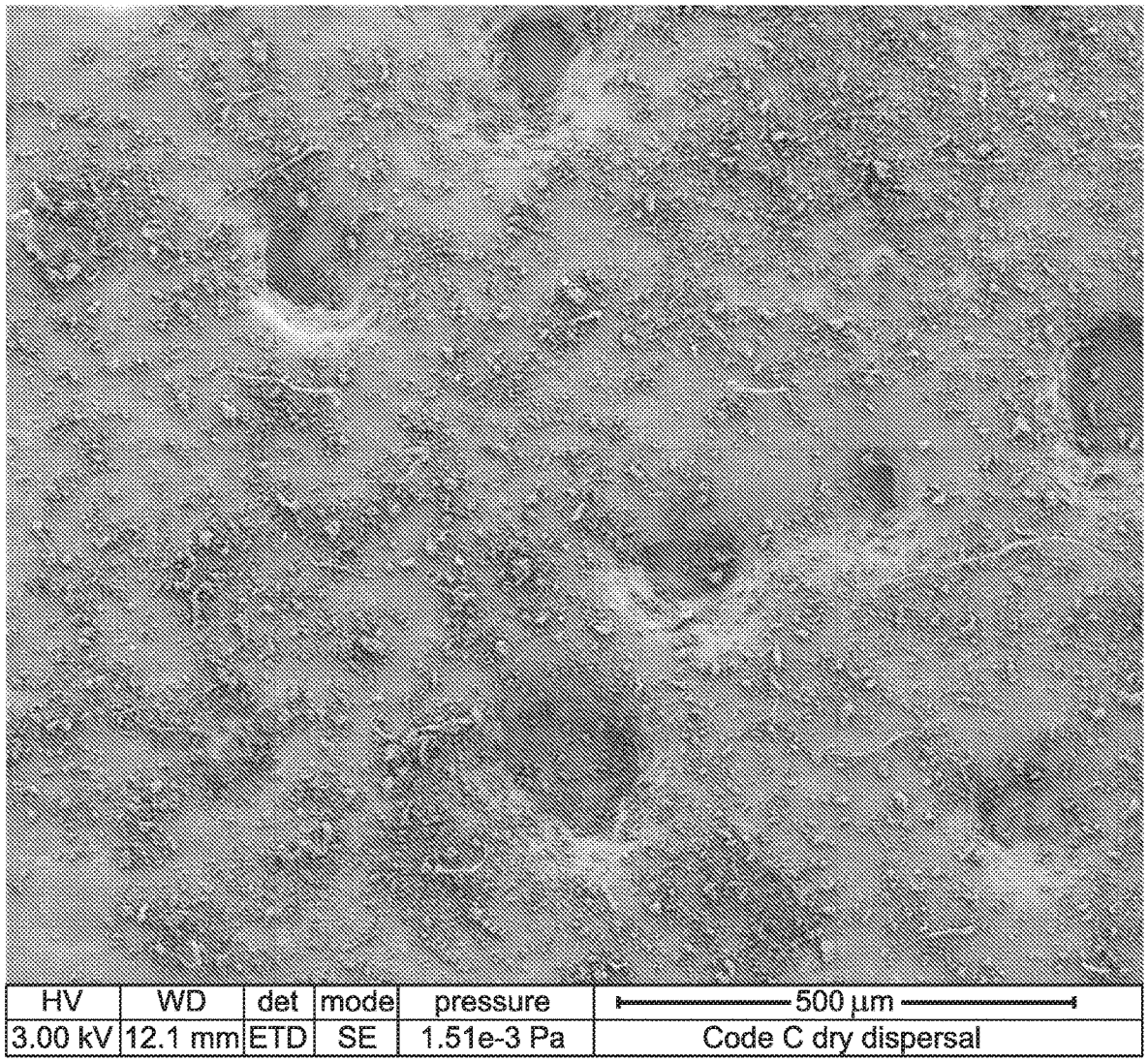
FIG. 7 illustrate SEM photos of spray dried NFC fibers using a NFC slurry with NHB effect.

Further, FIG. 6 illustrates SEM photos of spray dried NFC fiber using a NFC slurry without NHB effect and FIG. 7 depicts SEM photos of spray dried NFC fibers using a NFC slurry with NHB effect. FIG. 7 shows a significantly smaller average particle size and narrower particle size distribution with minimal clumping as compared to the non-NHB effect spray dried NFC fiber depicted in FIG. 6.

When a dry NFC powder is prepared by a spray dryer, it is equivalent to an oven drier without any moisture. However, due to its huge surface area and hydrophilic nature, NFC can quickly pick up moisture from air. Therefore, a spray dried NFC product, when sufficient conditioning time is provided such as at least 24 hours, it should be able to hold from 0 to 10 wt % moisture.

Experimental Sample Preparation Description

Nano-Fibrillation Process and NFC Fiber descriptions:

SH-CC-950: 10 grams of a cotton lint fiber was mixed with 200 grams of distilled water and stirred for 15 minutes to form a uniform suspension. The suspension was placed inside an ultra-low temperature freezer (Model MDF-40H150 manufactured by Zhongke Duling Commercial Electrical Co. Ltd. in Anhui Province) at a temperature of −40° C. for 6 hours. The frozen suspension was hammered into many ice cubes with a dimension around 1 cm. The ice cubes were loaded into a multi-functional grinder (Model JYL-0010 manufactured by Joyoung Group in Zhejiang Province) and ground at an ultra-high speed of 10,000 rpm for 1 minute, followed by a 30 second pause. Immediately after the pause, the ice cubes were continuously ground in this fashion of the grinding/pause for additional 7 times.

KC-NW3: 10 grams of a cotton lint fiber was added into a mixer (Model D2004W manufactured by Shanghai Meiyinpo Instrument and Meter Co., Ltd. in Shanghai, China) together with 200 grams of distilled water and 10 grams of Na2CO3. After all the materials were dispersed uniformly and dissolved completely, the mixture was transferred into a high temperature high pressure reactor (Model ZRY-K03110 manufactured by Zhengwei Mechanical Equipment Limited, located in Weihai, China). The reactor was heated at a rate of 150° C./hour. When the temperature reached 160° C., keep this temperature for 4 hours. After this step, reduce the temperature at a rate of 50° C./hour to room temperature and then the treated cotton lint fiber was taken out of the reactor. The fiber was then immersed in the mixer with a pre-prepared 200 grams of 5% HCl solution for 1 hour at a stirring rate of 200 rpm. After 1 hour, the cotton lint fiber was dewatered by a centrifugal machine (Model: SAKURA T98-1088 9.8 kg manufactured by Oriental Sakura Motor Co. Ltd. in Wuhan, China). The dewatered and treated cotton lint fiber was then diluted by water to form a 1,000 gram dispersion and placed into a homogenizer (Model 60L70 manufactured by Shenlu Homogenizer Co. Ltd. in Shanghai, China) for a homogenization process under a pressure of 60 MPa. The fiber went through this homogenizer at least three times during the entire treatment in order to achieve NFC with a diameter in a nano-size we want (i.e., a few hundred nano-meter). After the treatment, the fiber was dewatered by the centrifugal machine for 2 minutes at a rate of 600 rpm. The dewatered fiber was diluted by water to a total weight of 200 grams and mixed for 10 minutes and then dewatered again for 2 minutes at the same rate. This washing step was repeated for at least three times until pH value of the fiber dispersion reached about 7.

NNC-4: 10 grams of a *Eucalyptus* wood pulp fiber was added into a mixer (Model D2004W manufactured by Shanghai Meiyinpo Instrument and Meter Co., Ltd. in Shanghai, China) together with 200 grams of distilled water and 10 grams of $Na_2CO_3$. After all the materials were dispersed uniformly and dissolved completely, the mixture was transferred into a high temperature high pressure reactor (Model ZRY-K03110 manufactured by Zhengwei Mechanical Equipment Limited, located in Weihai, China). The reactor was heated at a rate of 150° C./hour. When the temperature reached 160° C., keep this temperature for 4 hours. After this step, reduce the temperature at a rate of 50° C./hour to room temperature and then the treated wood pulp fiber was taken out of the reactor. The fiber was then immersed in the mixer with a pre-prepared 200 grams of 5% HCl solution for 1 hour at a stirring rate of 200 rpm. After 1 hour, the wood pulp fiber was dewatered by a centrifugal machine (Model: SAKURA T98-1088 9.8 kg manufactured by Oriental Sakura Motor Co. Ltd. in Wuhan, China). The dewatered and treated cotton lint fiber was then diluted by water to form a 1,000 gram dispersion and placed into a homogenizer (Model 60L70 manufactured by Shenlu Homogenizer Co. Ltd. in Shanghai, China) for a homogenization process under a pressure of 60 MPa. The fiber went through this homogenizer once during the entire treatment. This is the difference a carbonate based alkali substance make in comparison to the popular used alkali agent, such as NaOH. After the treatment, the fiber was dewatered by the centrifugal machine for 2 minutes at a rate of 600 rpm. The dewatered fiber was diluted by water to a total weight of 200 grams and mixed for 10 minutes and then dewatered again for 2 minutes at the same rate. This washing step was repeated for at least three times until pH value of the fiber dispersion reached about 7.

NHB Effect Sample Preparation:

1080 NFC: *Eucalyptus* (EUC) wood pulp fiber was first treated according to what was described in a US patent (refer to U.S. Pat. No. 8,980,054 B2 Table 1 Sample No. 5). 10 grams of the modified EUC wood pulp fiber was added into a mixer (Model D2004W manufactured by Shanghai Meiyinpo Instrument and Meter Co., Ltd. in Shanghai, China) together with 200 grams of distilled water and 10 grams of $Na_2CO_3$. After all the materials were dispersed uniformly and dissolved completely, the mixture was transferred into a high temperature high pressure reactor (Model ZRY-K03110 manufactured by Zhengwei Mechanical Equipment Limited, located in Weihai, China). The reactor was heated at a rate of 150° C./hour. When the temperature reached 160° C., keep this temperature for 4 hours. After this step, reduce the temperature at a rate of 50° C./hour to room temperature and then the treated wood pulp fiber was taken out of the reactor. The fiber was then immersed in the mixer with a pre-prepared 200 grams of 5% HCl solution for 1 hour at a stirring rate of 200 rpm. After 1 hour, the wood pulp fiber was dewatered by a centrifugal machine (Model: SAKURA T98-1088 9.8 kg manufactured by Oriental Sakura Motor Co. Ltd. in Wuhan, China). The dewatered and treated wood pulp fiber was then diluted by water to form a 1,000 gram dispersion and placed into a homogenizer (Model 60L70 manufactured by Shenlu Homogenizer Co. Ltd. in Shanghai, China) for a homogenization process under a pressure of 60 MPa. The fiber went through this homogenizer once during the entire treatment. After the treatment, the fiber was dewatered by the centrifugal machine for 2 minutes at a rate of 600 rpm. The dewatered fiber was diluted by water to a total weight of 200 grams and mixed for 10 minutes and then dewatered again for 2 minutes at the same rate. This washing step was repeated for at least three times until pH value of the fiber dispersion reached about 7.

D1: 50 grams of a 1% NFC dispersion prepared according to the sample NNC-4 were dewatered by the centrifugal machine at a rate of 600 rpm for 2 minutes and then washed by ethanol at a ratio of the fiber to ethanol 1 to 30. The mixture was stirred by the mixer for 5 minutes at a speed of 400 rpm. After the mixing step, the mixture was dewatered again at 600 rpm for 2 minutes. Repeated this washing step for three times and then added ethanol into the dewatered NFC fiber until it reached a total weight of 50 grams and kept it as a stock dispersion for later use. Added 5 grams of γ-aminopropyl-triethoxysilane into 45 grams ethanol, mix for 5 minutes at a rate of 400 rpm and form a uniform solution. Added this solution into the previously prepared stock dispersion and stirred at 400 rpm for 2 minutes while heating the mixture slowly to 80° C. and kept at the temperature for 4 hours while dropping into the mixture with 5 grams of a 5% ammonia over a period of 20 minutes. By the end of the 4 hour mixing, the treatment was completed and the NFC fiber was successfully treated.

A Method of Preparing a Dried NFC:

A nano-fibrillated cellulose (NFC) fiber may have a wide range of applications due to its nano-sized dimension and a super high surface area. However, it usually exists in a liquid dispersion/suspension because of its way of making and also has an ultrahigh viscosity that limits some potential applications for this material. Many research teams have attempted to produce a dry NFC fiber by either freeze drying or spray drying technologies. The common goal of these attempts is to obtain a dry NFC fiber without significant amount of fiber being bundled back to be macro-sized due to potential formation of hydrogen bonds during a drying process.

The spray drying method of a cellulose NFC fiber slurry cannot avoid formation of interfiber knits and results in high density bundled fibers due to hydrogen bonds between nano-cellulose fibers. Accordingly, a freeze drying technology can effectively prevent formation of hydrogen bonds between NFC fiber but is too slow to be able to produce a commercial level quantity with an acceptable price. The NFC fiber with the NHB effect (i.e., NHB NFC) disclosed herein provides an opportunity to develop a dried NFC fiber. Hydrogen bonding capability of a NFC fiber may need to be controlled at which the NHB NFC won't form a significant amount of hydrogen bonds during a spray drying process while the NHB NFC may still have enough capability to form reasonable enough hydrogen bonds when needed. NFC fibers with the NHB effect may then be spray dried to demonstrate a NFC fiber similar to a freeze dried NFC fiber. In other words, one of the embodiments disclosed herein is to produce the structured fiber network similar to a freeze dried NFC fiber by a spray drying method using a NHB NFC fiber.

EXAMPLES/RESULTS

Three NFC samples were tested accordingly: (1) control NFC without NHB effect; (2) NFC with organic silicate treatment, and (3) NFC from NHB fiber. All three samples were spray dried. The results are summarized in the table below:

TABLE I

Spray dried NFC properties and packing density comparisons

| NFC Sample Code | Description | Target Solids % | Sprayed NFC Properties | | Packing Density (g/cc) |
|---|---|---|---|---|---|
| | | | Weight (g) | Height (mm) | |
| 1 | NFC from EUC fiber | 0.5 | 1.26 | 5.1 | 0.504 |
| 2 | NFC from EUC fiber then treated by organic silicate (D1) | 0.5 | 0.91 | 7.5 | 0.247 |
| 3 | NFC from NHB fiber (1080) | 0.5 | 1.53 | 10 | 0.312 |

Note:
Sample container's diameter is 25 mm

In view of the packing density data in table I above, the NFC from a NHB pulp fiber may achieve a similar structure as the NFC from a post treatment after the homogenization step fiber by the organic silicate process disclosed herein. Accordingly, these results support processes 2 and 3 to produce fine NFC particles by a spray drying process. In other words, the dried NFC is defined by its packing density.

When a dry NFC fiber is prepared by a spray dryer, it is like an oven dried without any moisture. However, due to an NFC fiber's huge surface area and hydrophilic nature, a NFC fiber can quickly pick up moisture from air. Therefore, a spray dried NFC product, when a sufficient conditioning time such as greater than about 24 hours is provided, should be able to hold from 0 to 10 wt % moisture.

All documents cited in the Detailed Description are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by references, the meaning or definition assigned to the term in this written document shall govern. Those skilled in the art will recognize that the present disclosure may be manifested in a variety of forms other than the specific embodiments described and contemplated herein. Specifically, the various features described with respect to the various embodiments and figures should not be construed to be applicable to only those embodiments and/or figures. Rather, each described feature may be combined with any other feature in various contemplated embodiments, either with or without any of the other features described in conjunction with those features. Accordingly, departure in form and detail may be made without departing from the scope of the present disclosure as described in the appended claims.

What is claimed is:

1. A method for preparing a spray dried non-hydrogen bonded (NHB) nano-fibrillated cellulose (NFC) composition comprising:

treating a cellulose fiber with a weight % of at least about 1% or higher in water slurry with a soda based alkali under a combination of temperature and pressure, wherein the temperature and pressure comprises a temperature of about 140 to 150° C.;

neutralizing the treated cellulose fiber with an acid after treating the cellulose fiber with the soda based alkali slurry such that gas bubbles form within the cellulose fiber;

homogenizing or ultrasonic treating the pre-treated cellulose fiber to form a NFC slurry;

dewatering the NFC slurry by a centrifugal machine to achieve a solid level at a weight % of at least about 10 or higher;

mixing the treated NFC slurry with alcohol at a ratio of 1 part NFC to 30 parts alcohol;

reacting the treated NFC slurry with a reagent having a general formula (I) or (II) at an elevated temperature at least about 20° C. or higher for at least 30 minutes, wherein reacting comprises heating the treated NFC slurry to the elevated temperature for the at least 30 minutes

 (I)

wherein R1 equals a carbon containing alkane group;
wherein X1, Y1, Z1 are alkoxy groups, whereby these groups may be the same or different; or

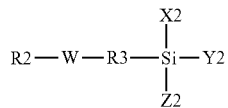 (II)

wherein R2 equals a carbon containing alkane group;
W is either oxygen (O) or nitrogen (N) atom;
R3 equals a carbon containing alkane group;
X2, Y2, Z2 equal alkoxy groups, wherein these groups may be the same or different;
and thereafter drying the NFC slurry with a spray drying equipment.

2. The method according to claim 1, wherein the cellulose fiber is wood pulp fiber.

3. The method according to claim 1, wherein the acid is HCl, nitric acid, sulfuric acid, acetic acid, phosphoric acid, citric acid or a mixture thereof.

4. The method according to claim 1, wherein the cellulose fiber is treated with the soda based alkali, wherein the soda based alkali water slurry is about 5 weight % the soda based alkali.

5. The method according to claim 1, wherein the NHB NFC fiber has an aspect ratio greater than about 20.

6. The method according to claim 1, wherein the NHB NFC fiber has an average diameter of about 100 nm to about 500 nm.

7. The method according to claim 1, wherein the spray dried NHB NFC fiber has a packing density less than about 0.4 g/cc.

8. The method according to claim 1, wherein the cellulose fiber is non-wood fiber.

* * * * *